L. B. COLLINS.
WEEDER AND VINE TURNER.
APPLICATION FILED JULY 14, 1916.

1,201,259.

Patented Oct. 17, 1916.

Inventor
Levin B. Collins,

By E. H. Bond

Attorney

UNITED STATES PATENT OFFICE.

LEVIN B. COLLINS, OF SHARPTOWN, MARYLAND.

WEEDER AND VINE-TURNER.

1,201,259.

Specification of Letters Patent.

Patented Oct. 17, 1916.

Application filed July 14, 1916. Serial No. 109,263.

*To all whom it may concern:*

Be it known that I, LEVIN B. COLLINS, a citizen of the United States, residing at Sharptown, in the county of Wicomico and State of Maryland, have invented certain new and useful Improvements in Weeders and Vine-Turners, of which the following is a specification.

This invention relates to certain new and useful improvements in weeders and vine turners and it has for its objects among others to provide a simple and cheap, yet strong, durable and efficient device readily attached to cultivators of known construction and by means of which the weeds are thrown up adjacent the stalks and the vines automatically turned away from the cultivator and the attachment and held in an elevated position out of the way until the cultivator and attachment have passed the plants. The member which acts upon the weeds adjacent the stalks or plants proper serves to brace the point of the attachment and the vine-turner is so attached to the point that it may be readily replaced should occasion require.

The device as a whole is capable of manufacture at minimum cost, can be applied to any cultivator by unskilled labor and when in position will most effectually do the work for which it is intended.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a perspective view showing my improvement applied to a cultivator, portions of which are shown by dotted lines. Fig. 2 is a top plan of the attachment. Fig. 3 is a side elevation of the attachment with portions broken away and parts in section. Fig. 4 is an enlarged view in bottom plan showing the point and the attachment of the weeding and vine turning members thereto.

Like numerals of reference indicate like parts throughout the several views.

As shown in the accompanying drawings, the device embodies a rod or member 1 having one end shaped to form a broadened point 2 which is adapted to project into the ground to a greater or less extent, preferably to about the extent shown in Fig. 3 where the dotted line 2—2 indicates the ground level. This rod or member 1 projects upwardly and rearwardly from the point 2, as seen in Figs. 1 and 3, and at its rear end it is given a lateral bend, as at 3, preferably upon a curve, as shown, and the free end extended forward to constitute the attaching arm or member 4 which is provided with openings 5 for the reception of bolts, rivets or screws or other means by which the same may be attached to the beam 6 of a cultivator of any well-known form of construction. The member 4 may sometimes be provided with the lateral offset 7 at its free end, as shown in Figs. 1 and 2, which may engage a shoulder on the beam 6 or may be extended into a recess or notch in said beam to give greater rigidity to the attachment. The member 4 is extended at an angle to the inclined rod or member 1, the said member 4, in practice, being designed to be substantially horizontal so as to extend parallel with the beam 6, as seen in Fig. 1.

8 is the weeding rod or member. It extends rearward from the point 2 substantially horizontally, as seen in Fig. 8, and inclined outwardly from the rod or member 1, as seen in Fig. 2, in practice being designed to extend substantially parallel with the beam 6 and at an angle to the rod or member 1, as seen in Fig. 2. This member 8 extends for a greater or less distance to the rear of the bend 3 of the rod or member 1 where it is bent, as at 9, and extended transversely, as at 10, and thence bent, as at 11, forming the upwardly inclined arm 12, the free end of which is bent around the curved bend 3 of the rod or member 1 in the form of an eye, as shown at 13. This forms a rigid connection and the curvature of the bend 3 prevents lateral displacement of the eye 13, as will be readily understood.

The member or rod 8 at its forward end is bent upon itself, as shown at 14, the bend being substantially straight-sided, as at 15, and engaging a corresponding shoulder 16 upon the rear under side of the point 2, as seen in Figs. 1, 3 and 4. The material of which the rod or member 8 is formed is thence extended rearwardly and upwardly forming the rearwardly and somewhat outwardly inclined vine turning member 17, the free end of which terminates at a point slightly below the rear end of the rod or member 1, although it may extend to a greater or less height, as may be found most expedient, and this member 17 is also inclined outwardly so as to extend in a vertical plane outside of that of the member or rod 8, as seen in Fig. 2. The weeding member or rod 8 and the vine turning member 17 are rigidly affixed in position at their bend 14 by means of a rivet or the like 18, as shown in Figs. 1, 2, 3 and 4, and this rivet being disposed at a right angle to the bend 3 to which the eye 13 is attached, the parts are held fixedly in position and are not liable to be injured or affected during the operation of the device.

The operation will be apparent. As the cultivator is drawn along, the point 2 of the attachment is drawn below the surface of the ground, as seen in Fig. 3, and the dirt about the plants loosened and the weeding member 8 in its passage through the loosened dirt turns up the weeds, the vines being engaged by the inclined vine turning member 17 by which they are carried upward and outward and held in an elevated position out of the way of the cultivator tooth or weeding member 8 and are thus held until the implement has passed to a point beyond where any injury would occur to said vines after they are dropped to the ground. By the use of an attachment such as above described I am enabled to remove the weeds in such close proximity to the plants as to avoid the necessity of an independent operation to remove such weeds after the cultivator has passed.

Modifications in details may be resorted to without departing from the spirit of the invention or sacrificing any of its advantages.

What is claimed as new is:—

1. A cultivator attachment comprising a rod with an attaching arm at one end and an earth-engaging point at the other end, a weeding member having one end secured to said point, said weeding member being extended rearwardly and at an angle to the first-named member and having a portion connected with said attaching member, and a vine turning member attached at one end to said point and extended upwardly and rearwardly and at an angle to the weeding member with its free end in a plane outside of that of said weeding member.

2. A cultivator attachment comprising a rod with an earth-engaging point and an attaching member, and a combined weeder and turning member integral with each other and secured to said point, said rod and weeder being connected together at their forward ends.

3. A cultivator attachment comprising a rod with an earth-engaging point and an attaching member, said point having a shoulder upon its under face, and a combined weeder and vine turning member integral with each other and bent to form a shoulder engageable with the shoulder of said point, and means attaching said weeder to said point and to said rod.

4. The herein described cultivator attachment comprising a rod having at one end an earth-engaging point and at the other end a lateral bend terminating in an attaching arm, a weeding member extending rearwardly from said point and having a transverse member at the rear and an upwardly inclined arm engaging the bend of the said rod, and a vine turning member extending upwardly and rearwardly from said point and disposed in a vertical plane outside of that of the weeding member.

In testimony whereof I affix my signature in the presence of two witnesses.

LEVIN B. COLLINS.

Witnesses:
P. T. White,
E. H. Cooper.

Copies of this patent may be obtained for five cents each, by addressing the "Commissioner of Patents, Washington, D. C."